Oct. 19, 1965 H. AGUILAR 3,212,545
METHOD OF ORIENTING AND PITTING FRUIT HAVING STEMS
Filed Jan. 30, 1963 4 Sheets-Sheet 1
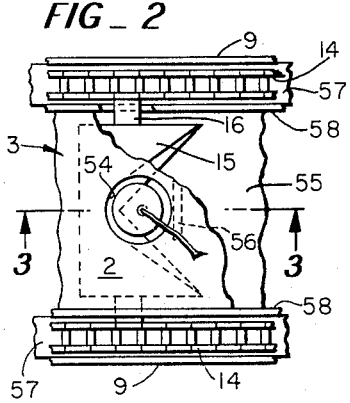
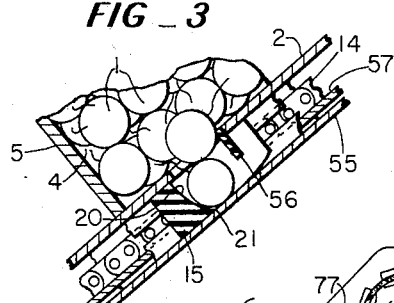
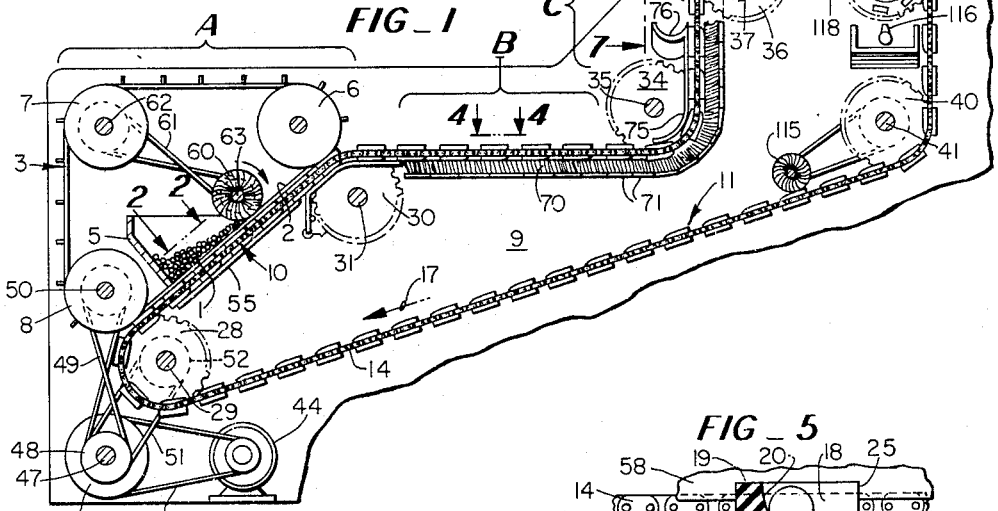
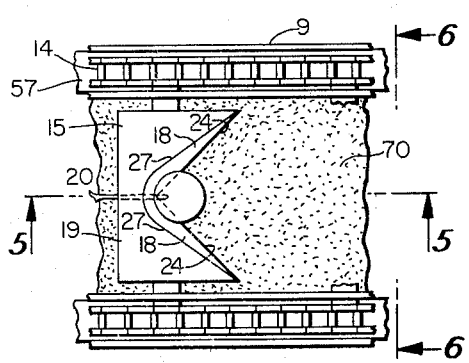
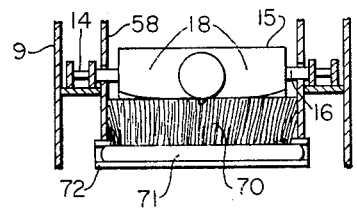
INVENTOR.
HENRY AGUILAR
BY Boyken, Mohler & Foster
ATTORNEYS Oct. 19, 1965 H. AGUILAR 3,212,545
METHOD OF ORIENTING AND PITTING FRUIT HAVING STEMS
Filed Jan. 30, 1963 4 Sheets-Sheet 2
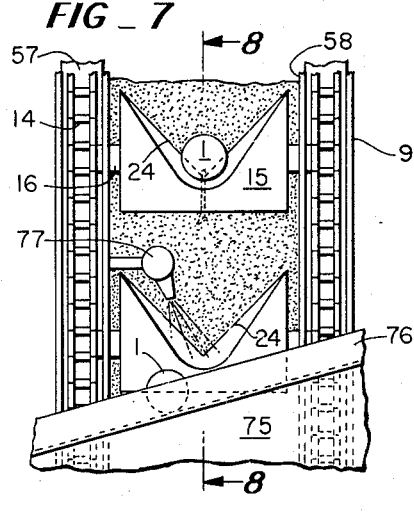
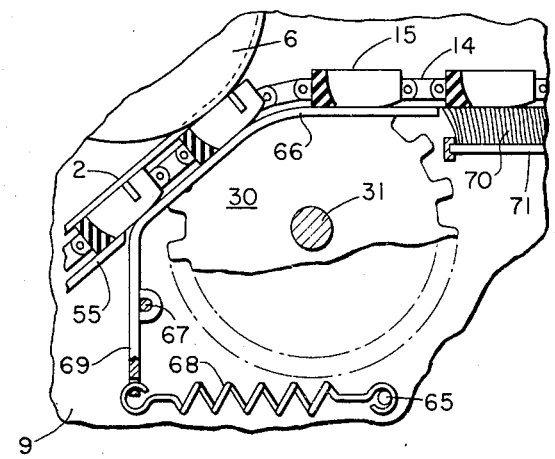
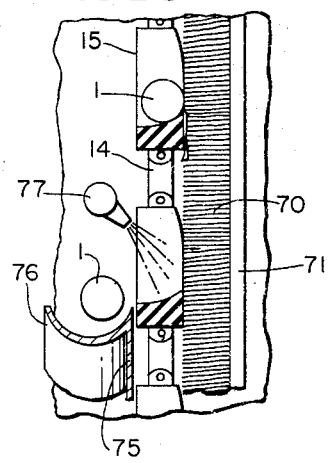
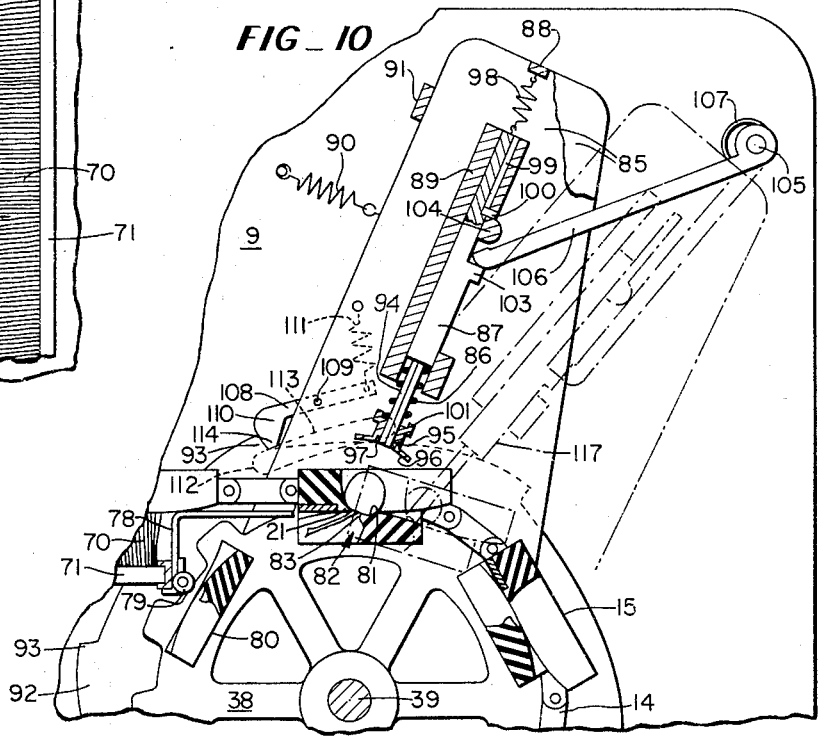
INVENTOR.
HENRY AGUILAR
BY
Boyken, Mohler & Foster
ATTORNEYS Oct. 19, 1965  H. AGUILAR  3,212,545
METHOD OF ORIENTING AND PITTING FRUIT HAVING STEMS
Filed Jan. 30, 1963  4 Sheets-Sheet 3
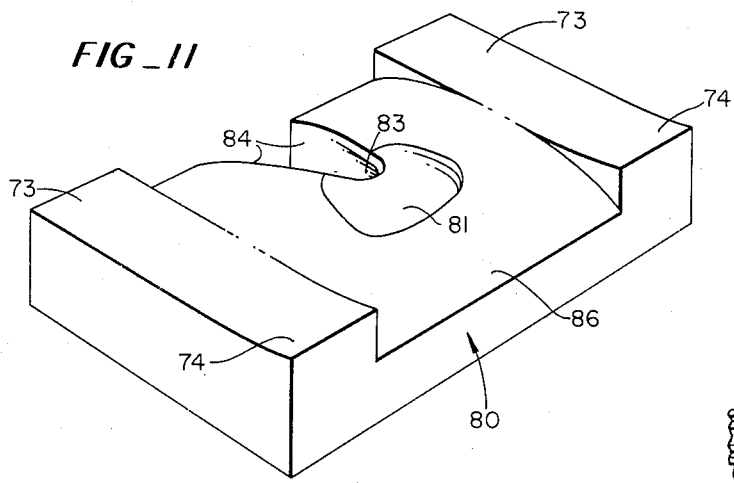
FIG_11
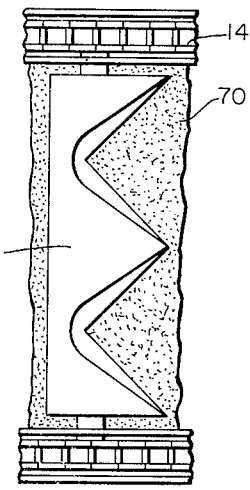
FIG_14
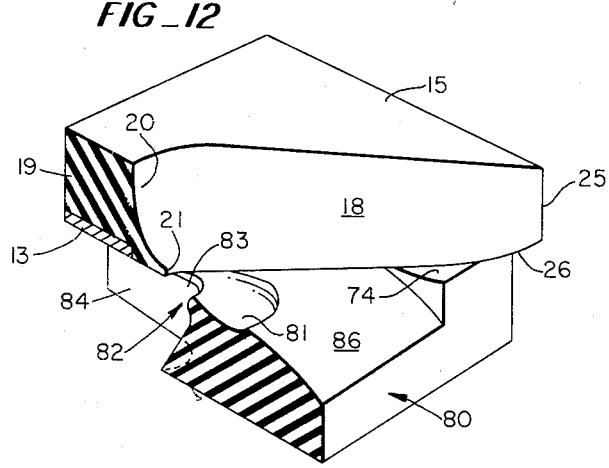
FIG_12
INVENTOR.
HENRY AGUILAR
BY
Boyken, Mohler + Foster
ATTORNEYS Oct. 19, 1965    H. AGUILAR    3,212,545
METHOD OF ORIENTING AND PITTING FRUIT HAVING STEMS
Filed Jan. 30, 1963    4 Sheets-Sheet 4
FIG_13
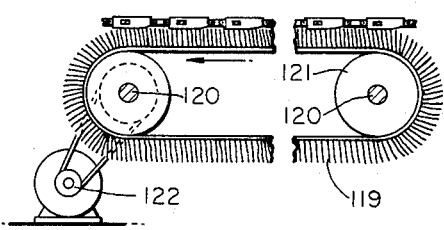
FIG_15
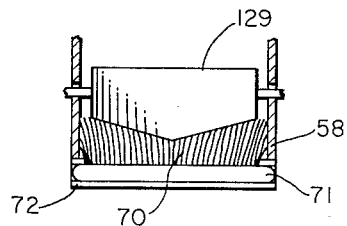
FIG_16
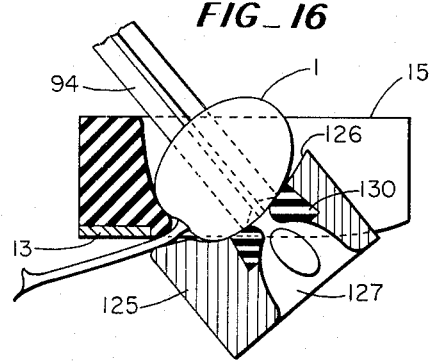
FIG_17
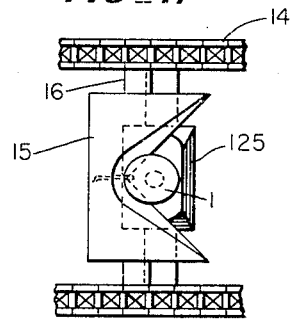
FIG_18
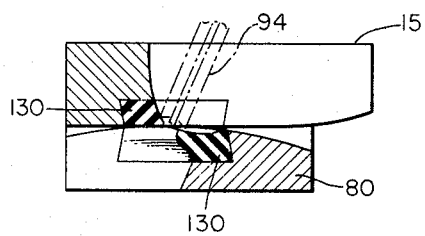
INVENTOR.
HENRY AGUILAR
BY
Boyken, Mohler & Foster
ATTORNEYS

United States Patent Office 3,212,545
Patented Oct. 19, 1965

3,212,545
METHOD OF ORIENTING AND PITTING
FRUIT HAVING STEMS
Henry Aguilar, 1309 27th Ave., San Francisco, Calif.
Filed Jan. 30, 1963, Ser. No. 255,016
5 Claims. (Cl. 146—224)

This invention relates to a machine, and to a method, for orienting drupes having stems thereon, such as cherries.

Several of the objects of the invention are the provisions of an improved machine and of an improved method for orienting drupes, such as unstemmed cherries and the like so their stem ends face in substantially the same direction so as to facilitate the proper pitting of each fruit body.

Other objects of the invention are the provisions of a machine, and a method for orienting drupes, such as unstemmed cherries and the like so their stems are first all directed in the same direction, and which drupes are then simultaneously stemmed and pitted along their blossom-stem axes with the pit pushing the stem out of the drupe in the operation of pitting.

Further objects of the invention are the provisions of a machine, and of a method, for moving such stemmed and unstemmed drupes in one direction along a path of travel to a pitter, and which machine and method provide for insuring the proper orientation of the blossom-stem axes of the unstemmed drupes for removing their pits from the stem ends thereof together with the stems, and which machine and method insure ejection of stemless drupes prior to the pitting step so that all of the drupes that are pitted will have had their pits removed from the stem ends thereof along their blossom-stem axes.

An added object of the invention is the provision of a machine and method for orienting unstemmed drupes such as cherries and the like, without removing the stem.

In actual practice, drupes such as cherries and the like, which are to be processed, are usually stemmed and then pitted, although in some instances the pits are removed, but the stems remain adhered to the body of each cherry. Such cherries are usually used for cocktails.

The stemming machines usually employ rotating stem gripping rollers between which the stems are gripped and are then pulled from the cherries.

Once the cherries are stemmed, they are usually moved about on a locating member that locates the indent at the stem end of each cherry, and a reciprocable element then punches the pit out of the stem end of each cherry along the blossom-stem axis.

The conventional method above described follows the stemming step, as an entirely separate step, and is only approximately accurate, since lopsided cherries, of which there are many, are not accurately oriented, and the indents at the stem ends of the cherries vary as to their depth. If too shallow, the member that locates the indent will continue to move a cherry after it has reached the desired position, and the cherry will be moved out of its properly oriented position by the time it reaches the pitting element. Cherries that have not been properly pitted along their blossom-stem axes are not of as high a grade as those that have been properly pitted, even though they may otherwise be the same.

The stems on cherries are relatively long, and most of the cherries as delivered to the packing plants, have their stems intact. By the present method, the unstemmed cherries are rolled about, as they are moved along a predetermined path in one direction, and as they are so rolled, their stems are guided to a trailing position where the stems are retained as the cherries are moved along said path, thus orienting the cherries with respect to their blossom-stem axes.

After the cherries are so oriented, the pits are ejected from the cherries, together with their stems, along their blossom-stem axes, with the stems leading, or pushed ahead of the pits.

Inasmuch as the cherries are fed to the machine in bulk, some stemless cherries may be among the unstemmed cherries and the present machine provides means for automatically ejecting the stemless cherries from the path of travel in which the cherries are moved before the cherries are pitted. As no provision is made for orienting stemless cherries, and as the proper orienting of stemless cherries in any event is not assured, while by the present method the orientation of unstemmed cherries is positive and their proper pitting is assured, it is seen that all of the cherries will be properly pitted.

As already mentioned, one object of the invention is to orient and to pit unstemmed fruit, leaving the stem on the fruit body. Provision is made whereby the same pitting element for simultaneously pitting and stemming a drupe may be shifted to reciprocate through each cherry along a line at an angle to the blossom-stem axis instead of axially of said axis, thereby punching the pit out of a lateral side of each cherry, leaving the stem intact with the body. The present method of orienting each cherry makes this step possible.

Other objects and advantages will appear in the description and in the drawings.

In the drawings, FIG. 1 is a cross sectional, partially broken away view of the machine of the present invention with one of the side frame members thereof removed to show internal structure.

FIG. 2 is an enlarged, fragmentary, top plan view of a portion of the machine, as seen from line 2—2 of FIG. 1.

FIG. 3 is a cross sectional view taken approximately along line 3—3 of FIG. 2, but it includes part of the lower end of a feed hopper that is seen in FIG. 1.

FIG. 4 is an enlarged, fragmentary, top plan view of a portion of the machine of FIG. 1, as seen from line 4—4 of FIG. 1.

FIG. 5 is a cross sectional view taken along line 5—5 of FIG. 4.

FIG. 6 is a cross sectional view taken aolng line 6—6 of FIG. 4.

FIG. 7 is an enlarged, fragmentary, side elevational view of part of the machine of FIG. 1 as seen from line 7—7 of FIG. 1.

FIG. 8 is a cross sectional view taken along line 8—8 of FIG. 7.

FIG. 9 is a fragmentary, enlarged, part sectional and part elevational view of a portion of the machine at the juncture between the feed station and the orienting station.

FIG. 10 is an enlarged, part sectional and part elevational view of the pitting mechanism at the pitting station, the near side of the frame of the machine being removed.

FIG. 11 is an enlarged, perspective view of a pit passing member that is part of the pitting assembly.

FIG. 12 is an enlarged, part perspective and part sectional view of the member of FIG. 11 in operative relation to one of the holders seen in FIGS. 4–6 when the latter is at the pitting station.

FIG. 13 is a structure that may be substituted for a portion of the machine of FIG. 1 at the orienting station.

FIG. 14 is a fragmentary top plan view similar to that of FIG. 4 illustrating two cherry moving members instead of the single member shown in FIG. 4.

FIG. 15 is a cross sectional view similar to that of FIG. 6 but showing a slight modification of the latter.

FIG. 16 is a fragmentary, enlarged, cross sectional view showing the pitting assembly of FIG. 10 in a slightly different position for side pitting a cherry so as to leave the stem intact, a different pit passing element being substituted for that of FIG. 10.

FIG. 17 is a top plan view of the pit passing member of the pitting arrangement of FIG. 16 with the upper cherry holding and moving element of FIG. 16 thereover in a pitting position for side pitting.

FIG. 18 is a cross sectional view of a modified form of the pitting assembly of FIG. 12.

*General description*

Referring to FIG. 1, the cherries 1 having stems thereon are fed onto the lower, inclined run 2 of an endless belt generally designated 3. This lower run extends between generally vertically disposed, opposed side plates 4, and a lower generally upwardly extending plate 5 extends between and connects the plates 4 adjacent to the lower end of run 2. This end plate 5 extends over the lower run 2 and close to the latter. Thus plates 4, 5 in combination with the lower run 2 of the belt 3 form a sort of feed hopper in which inclined run 2 is the lower side.

Belt 3 extends upwardly around an upper pulley 6 at the upper end of its inclined lower run 2, and then horizontally over a pulley 7 and downwardly from pulley 7 and around a lower pulley 8 from which the lower run 2 extends.

Any suitable frame 9 may support the pulleys.

Below the lower run 2 of belt 3 is the upper run 10 of an endless conveyor generally designated 11. The upper run 10 of said conveyor extends longitudinally of and parallel with the lower run 2 of belt 3.

For the purpose of describing different portions of the conveyor 11, the left hand portion which comprises the upwardly inclined part of the upper run 10 that is below the run 2 of belt may be termed the "Feed Station" and is designated "A."

The upper run 10 of conveyor 11 extends substantially horizontally away from and in continuation of the upper end of the conveyor at the feed station "A," and this horizontally extending portion may be called the "Orienting Station," and is designated "B."

At the right hand end of the orienting station B, the conveyor 11 extends upwardly, and this upwardly extending portion is called the Separating Station "C," and it is here that the cherries without stems are separated from the unstemmed cherries, and where the stemmed cherries are carried away from the machine.

At the upper end of the portion of conveyor 11 that is at the separating station C, the conveyor again moves horizontally to the right to the pitter at the Pitting Station designated "D."

The conveyor 11 comprises a pair of spaced, endless chains 14 (FIGS. 2–6) between which are a plurality of cherry holding and moving members 15.

FIGS. 3–6 show the members 15 in detail, and while the members illustrated are adapted to move cherries in a single file or longitudinally of such file or row, the holders may be made to simultaneously move cherries along a plurality of separate paths as seen in FIG. 14. In actual practice the members 15 each may be formed to move six, ten, or any number of rows of cherries.

Each member 15 comprises a block of resilient, but relatively firm, rubber or rubber-like material, having oppositely outwardly projecting rigid elements 16 each of which is rigidly secured at its outer end to one of the links of each sprocket chain 14 (FIGS. 3–6) for movement of the members 15 in cherry engaging positions, in the direction of the arrow 17 as seen in FIG. 1.

In describing each member 15 more in detail, the use of the words "forward," "forwardly," "rear" and "rearwardly" and words of similar import, will be used with reference to the direction of movement of the members on the upper run of the conveyor 11 as generally indicated by arrow 11.

Each member 15, in top plan view, is generally of V-shape (FIG. 4) with the V on its side and with the open side facing forwardly so that a cherry 1 may be disposed between said sides and in engagement with the sides 18 of the V (FIG. 4) at its apex. However, the sides of the V at a level slightly above the lower surface of each member 15 do not come to a sharp apex, but are rounded as at 19 to generally conform to the outer contour of each cherry, except that the curve has a slightly greater arc than the spherical contour of each cherry so that a cherry will not be pinched between the sides 18 of member 15 at the apex thereof, but will be free to roll, as will later be described.

The rear wall 19 (FIGS. 4, 5) of each member 15, at the apex between sides 18, is curved to extend slightly forwardly at 21 (FIG. 5) at the lower side of each member 15. The degree to which the portion 21 projects forwardly relative to the generally vertically extending forwardly facing surface of rear wall 20 is not sufficient to support a cherry, but will extend a slight distance under such cherry. The edges 24 (FIG. 4) of each member 15 along the lower side thereof, are straight and come together at the forward end of the portion 21, although their juncture may be slightly rounded so as not to pinch a stem, as will later be explained.

The forward edges 25 (FIG. 5) of the sides 18 of each V member may be substantially vertical, but the lower surface 26 of each side is preferably curved slightly upwardly. The length of each side 18 is preferably greater than the maximum length of the cherry stems and the thickness of each member 15 may be slightly greater than the maximum thickness of the cherries to be oriented. The angle at which the sides 18 extend from each other may be approximately 90 degrees.

The generally forwardly facing V-surface of each member commences with an approximately straight vertically disposed surface at the forward edges 25 of the sides 18 and becomes progressively concavely curved, in vertical cross sectional contour for a short distance upwardly from the straight edges 24 to the apex where the curve is greatest, but sides 18 above the concavely curved portion are in upward and slightly rearwardly inclined continuation of said portion, and terminate along the upper edges 27 of each side 18 progressively greater distances generally rearwardly of the straight lower edges 24 commencing at forward straight vertical edges 25.

Sprocket wheels 28 on a shaft 29, at the feed end of the conveyor 11, support chains 14 at the lower end of the feed station A, and a similar pair of sprocket wheels 30 on a shaft 31 support chains 14 of the upper runs thereof at the juncture between the feed station A and the orienting station B. Sprocket wheels 34 are at the juncture between the orienting station B and the separating station C, but are at the reverse side of chains 14 from the side that extends over sprocket wheels 30, inasmuch as the chains extend generally vertically upwardly at the separating station C. Shaft 35 journalled for rotation on frame 9 supports the sprocket wheels 34.

At the upper end of the separating station C the chains 14 extend over a pair of sprocket wheels 36 supported on a rotatably mounted shaft 37, the said sprocket wheels being in engagement with the sides of the chains engaged by sprocket wheels 28, 30.

From sprocket wheels 36 chains 14 carrying the cherry holding and moving members extend generally horizontally and over a pair of sprocket wheels 38 on a shaft 39 of the pitting device at the pitting station D.

From the pitting station D the chains 14 extend downwardly and over sprocket wheels 40 on a shaft 41, the latter being journalled for rotation in bearings on frame 9, the same as the other sprocket shafts 29, 31, 35, 37 and 39. From the sprocket wheels 40 the chains 14 extend back to sprocket wheels 28. Any suitable chain tightener (not shown) may be positioned to engage the length of the lower runs of chains 14 between the sprocket wheels 40, 28.

Merely by way of illustration, a motor 44 may be connected by chain or belt 45 with a pulley 46 secured on a shaft 47, which shaft 47 is rotatable in bearings on frame 9. Shaft 47 carries a pulley 48 connected by a crossed belt 49 with a pulley on shaft 50 that supports pulley 8. A similar belt 51 connects a pulley on shaft 47 with a pulley 52 on shaft 29. By this arrangement the belts 3, and conveyor 11 are actuated, and whether belts, chains, gears, sprocket wheels or other means for transmitting power to the belts 3 and conveyor 14 is employed is a matter of choice, except that whatever means is employed the belt 3 and conveyor 11 move at the same rate of speed as will later appear.

Feed station

The belt 3 is formed with circular, equally spaced openings 54 (FIGS. 2, 3) each of which is adapted to register with the space between sides 18 of each cherry holding and moving element at the apex of said sides. Each opening 54 is larger than the largest diameter cherry, but not sufficiently large to pass two cherries at a time or for a pair of cherries to become wedged in an opening.

As the lower run 2 of belt 3 and the upper run of conveyor 11 move upwardly at the feed station, one of the cherries in the feed hopper will pass through each opening 54 to a position against the rear wall 19 of each holder 15. A depending tab 56 on belt 3 at the forward edge of each opening 54 prevents the cherry that is deposited between the sides 18 of each holder 15 from falling out of the holder.

The chains 14 may be slidably supported on guide strips 57 (FIG. 2) that are secured to the opposed sides of frame 9. The space below the holders 15 is closed by a plate 55 which is secured to frame 9 and prevents the cherries from falling through holders 15. The guide strips 57, side plates 58 that extend upwardly between the chains and the holders 15 to approximately elements 16 to form the inner opposed guide strips for the chains.

A rotary brush 60 extends across the upper side of the lower run 2 of belt 3 adjacent to pulley 6. This brush is secured on a shaft that is rotatable in bearings carried by frame 9 and may be rotated in the direction of the arrow that is adjacent thereto by a belt connector 61 between pulleys respectively on shaft 62 that mounts pulley 7 and on the brush shaft 63.

By this arrangement, cherries on the lower run 2 of belt 3 that may not enter any of the holes 54 will be swept back toward the lower end 5 of the feed hopper.

A metal strip 66 (FIG. 9) extends below and substantially against the lower sides of the cherry holders 15 from the point where the belt 3 leaves the conveyor 11 to pass around pulley 6. This strip 66 may be swingably mounted on a rod 67 that is secured to the frame 9, and it extends upwardly and forwardly from rod 67 to a point approximately past the sprocket wheels 30, and is yieldably held against the holders 15 by a spring 68 that is connected at one end to an extension 69 of said strip 66 and at its opposite end to a pin or rod 65 that is secured to frame 9. By this arrangement, the cherries 1 will not fall from between the sides of the holders 15 and the yieldability of the strip 66 will permit the stems that may depend from the holders to pass over the strip 66. Side strips along the sides of the holders 15 will prevent the cherries from rolling off the strip 66.

Orienting station B

As soon as the conveyor 11 passes the sprockets 30, the strip 66 ends and the holders 15 will ride on the upper ends of the bristles 70 supported in a rigid backing 71 that is so arranged as to form a continuous stationary brush support between strip 66 and the pitting station.

This virtually continuous brush may be made up of separate brushes in which the backs 71 (FIG. 5) are held at opposite ends in generally I shaped strips 72 secured at their ends to frame 9. The supporting I strips may be removably secured to the frame to enable replacement of the brushes.

While separate brushes may make up the continuous bristle supports from strip 66 to the pitting station, it may hereafter be referred to in the singular, since it may be made in one piece, such as a semi-rigid backing strip with the bristles secured at one of their ends thereon, and which strip is adapted to follow the linear contour of the conveyor 11 between strip 66 and the pitting station, and to be held on the frame 9.

The width of brush 70 is preferably slightly greater than the transverse width of each cherry holder 15 (FIG. 6) and extends to side plates 58 that are rigid with the frame 9.

As soon as the cherries are supported on the free ends of the bristles 70 of the brush, each cherry will rotate until the stem engages the bristles. Upon such engagement, the stems will be carried beneath each holder 15 that is now pushing the cherry over the brush, and will move to a trailing position aligned with the path of travel of the cherry. The bristles are yieldable and their free ends slidably engage the undersides of the holders, flexing slightly under pressure against said undersides, and the divergence of the two sides 18 of each holder causes the bristles, as they engage the edges 24, to be curved slightly inwardly toward a medial line extending longitudinally of the path of travel of the holders 15. This inward movement of the bristles (FIG. 6) cooperates with the stem to align the stem on said medial line. As soon as the stem is in its trailing position and on said medial line, it will stay there as long as the cherry is in the holder.

The bristles 70 may be of plastic or any other suitable material, in any event the stems will be between the bristles when aligned, and the uniform inward bending of the bristles will keep it there, although it will normally remain aligned.

Separating station C

Inasmuch as some of the cherries that are fed into the holders 15 may be stemless, it is desirable that these be removed before they reach the pitting station, since they would not be oriented at said pitting station, and would likely be improperly pitted.

As soon as the conveyor 11 reaches the sprocket wheels 34, and while they are still on the brush 70 at the orienting station B, the holders 15 will pass below a strip 75 (FIG. 1), so that the stemless cherries will not fall out of the holders as the latter move upwardly at the separating station. This strip 75 is carried by frame 9, and it terminates at its upper end above the sprocket wheels 34 (FIG. 8). Along the terminating edge of strip 75 is an upwardly opening, inclined trough 76 (FIGS. 7, 8) and as the holders 15 pass the terminating upper end of strip 75, the cherries without stems will roll into the trough and then down the trough and out of one side of the machine. The cherries having their stems will continue upwardly and pass the sprockets 36, since the brush 70 will hold the cherries in the holders.

In order to insure against any of the stemless cherries sticking in the holders 15, a water jet 77 is directed against one of the generally opposed inner surfaces of the sides 18 to wash such cherry out of the holder and into the trough 76.

After the conveyor 11 passes over the sprocket wheels 36, it moves horizontally to the pitting station D and over sprocket wheels 38 at said station, the brush 70 still retaining the unstemmed cherries against the rear wall of each holder with their stems in trailing positions.

A plate 78 extends from the terminating end of brush 70 at the pitting station to the pitter (FIG. 10) which plate is yieldably but very lightly held against the stems of the cherries as the stems leave the brush 70 to be carried to the pitter. The gap between the brush and the pitter is slight, and the stems will remain oriented until the cherries reach the pitting point in the pitter. A torsion spring 79 yieldably holds the plate 78 against said stems.

*Pitting station*

A portion of frame 9 at the pitting station (FIG. 10) has bearings that rotatably support the shaft 39 that carries the sprocket wheels 38, however, these sprocket wheels are connected adjacent to their outer peripheries by an annular row of circumferentially spaced pit passing members generally designated 80 (FIGS. 10, 11). These pit passing members are of relatively stiff, but resilient rubber or the like, and are disposed between and connect the sprocket wheels 38 adjacent to their outer peripheries.

These members 80 are spaced around wheels 38 so as to register below each of the cherry holders 15 as the chains 14 pass around and rotate the sprocket wheels 38.

As seen in FIG. 11, each member 80 is formed with a concave recess 81 in its radially outwardly facing side (with respect to the axis of the sprocket wheels 38), and this recess is adapted to receive each cherry 1 (FIG. 10) as the members 80, 15 meet with the latter member superposed over member 80 at the top of the sprocket wheels. A downwardly and rearwardly extending passageway 82 extends through the member 80, said passageway being restricted at its upper end as at 83 (FIG. 12), and which restricted portion must stretch slightly under the influence of a pit as the latter is pushed through, while the pit is free to fall by gravity below such restricted portion.

A vertical, rearwardly extending slot 84 opens at its forward end into the passageway 82 and at its rear end at the rear edge of each member 80 (FIG. 10), which slot passes the stem 84 of each cherry as the members 15, 80 come together.

It should be noted that the central portion 86 of the upper surface of member 80 is convexly curved about a radius which extends to the axis of wheel 38. This will allow members 80 to revolve past plate 78, which is slightly narrower than portion 86, without sharply contacting plate 78 with either the leading or trailing edges of member 80.

The marginal portions 73, on either side of central portion 86 of the upper surface of member 80, curve slightly upwardly as at 74 at the forward edge of member 80. These curved surfaces 74 correspond to curved lower surfaces 26 on member 15 and when member 15 is positioned over member 80 the relation between surfaces 26 and 74 will prevent any undesirable rocking motion between said members.

Oscillatably supported on the shaft 39 that carries sprocket wheels 38, and between the frame members 9, are a pair of upwardly extending similar plates 85 (FIG. 10) that may be connected at their upper ends by a bar 88, and by a vertically elongated guide 89 disposed between said plates. A spring 90 connected with one of said plates 85 and with frame 9 yieldably holds the plates in a rearward position against a stop 91 rigid on frame 9.

Rigid and concentric with shaft 39 is a ratchet wheel 92 having spaced teeth 93 thereon. Said teeth are uniformly spaced apart a distance approximately equal to the spacing between the members 80 that are carried by the sprocket wheels, or by the members 15 on chains 14. The surface of teeth 93 are formed to correspond to the surface of a tooth 110 on a pawl 108 with which teeth 93 cooperate. The surface of tooth 110 is arcuate about the pivot 109 upon which pawl 108 is mounted. This structure will prevent relative movement between plates 85 and ratchet wheel 92 when the two are connected by pawl 108 as will be described later.

Reciprocably supported in guide 89 and extending longitudinally thereof is a rod 87 that carries conventional elongated pit ejecting blades 94 projecting axially downwardly from the lower end of rod 87. These blades project radially outwardly relative to the longitudinal axis of the rod 87, and may be four to six in number. Usually, there are five or six.

Reciprocably supported on blades 94 longitudinally thereof and extending thereagainst is a sleeve 95 having a flange 96 at its lower end that is generally conical so as to provide a conical inner surface adapted to engage a cherry around the blades to center such cherry relative to the blades for a pitting operation and to strip the cherry from said blades.

A spring 86 around the blades reacts between the end of rod 87 at its juncture with the blades 94 and flange 101 to yieldably hold the sleeve 95 at the lower end of the blades against slight radially outward extensions 97 on said blades, and with the flange 96 projecting axially outwardly of the lower ends of the blades 94.

The rod 87 is held yieldably in an upward retracted position, as seen in full line in FIG. 10 by a spring 98 that is connected at one end with the upper end of said rod and at its other end with members 88. One side of said rod is formed with a spline 99, and a pin 100 extends through the upper portion of guide 89 into the spline to form a stop against which the lower closed end of the spline engages when rod 87 is in its upper retracted position.

Guide 89 is tubular, with the forward side open for a substantial distance, longitudinally of rod 87 below the pin 100.

The forward side of rod 87 that is exposed through said open side of the guide 89 is formed with a projection 103 at a point adjacent to the upper end of the open forward side of the guide 89 when the rod 87 is in fully, upwardly retracted position, and the forward side of the guide 89 adjacent to the upper end of said opening is formed with a convexly rounded forward projection 104.

Spaced forwardly of the upper end of plates 85 that carry guide 89 and rod 87 is a horizontal pivot 105, carried by frame 9, and this pivot swingably supports the upper end of an elongated pawl 106, which pawl extends slantingly downwardly and rearwardly so that its lower end engages the upper side of the projection 103 on rod 87. Any suitable means, such as a torsion spring 107 around pivot 105 yieldably holds the lower end of said pawl 106 over the projection 103 when the rod 93 is in its retracted position, and yieldably resists swinging of the lower end of the pawl in a counterclockwise direction as viewed in FIG. 10.

A ratchet pawl 108 is pivotally supported on one of the plates 85 between such plate and the portion of frame 9 that is adjacent thereto (FIG. 10). Pivot 109 pivotally supports such pawl in a position in which said pawl extends rearwardly and slantingly downwardly from said pivot so that its tooth 110 will be engaged by each tooth 93 on ratchet wheel 92 as the latter is rotated clockwise, as seen in FIG. 10. A forward projection on pawl 108 projecting forwardly of the pin 109 is connected with one end of a spring 111, and the other end of the spring 111 is connected with the plate 85 adjacent thereto for yieldably holding the tooth 110 in a position to be engaged by each tooth 93 on the ratchet wheel.

The portion of frame 9 adjacent to pawl 106 is provided with a stationary cam 112 that has an upper cam surface 113 that is slidably engaged by a lateral projection 114 on tooth 110 of the pawl 108. This cam surface extends slantingly upwardly and forwardly relative to the circular path of travel of the teeth 93 of the ratchet wheel 92. Thus, as the ratchet wheel rotates clockwise, as seen in FIG. 10, the pawl tooth 110 will be progressively forced radially outwardly until it clears the tooth 93 with which it is engaged, at which time the plates including all elements carried thereby will be returned to the position shown in full line in FIG. 10 after rod 87 is withdrawn.

As the conveyor 11 carries the cherries to the pitter, and as soon as each cherry holding member 15 and each pit passing member 80 are in register, as seen in FIG. 1, a tooth 93 on ratchet wheel 92 will engage the tooth 110 of pawl 108, and the plates 85 that carry the pitting blades 94 and rod 87 will commence to move clockwise (as seen in FIG. 10) against the resistance of spring 90.

As the plates move clockwise under the influence of the ratchet wheel 92, the pawl 106 which is carried by the stationary frame 9 will commence to move the rod 87 and pitting blades 94 downwardly.

The cherry 1 will have its stem-blossom axis substantially coaxial with the axis of the rod 87 and the pitting blades, and the ends of the blades 94 will enter the blossom end of the cherry. The blades 94 will move with the cherry engaged thereby and the pit will be progressively forced out of the stem end of the cherry through the restricted pit passing opening formed by the projection 21 on cherry holding member 15 cooperating with the restricted upper end 83 of passageway 82 in member 80, and as soon as the pit is past said restricted pit passing opening, the contraction of the latter will quickly eject the pit into passageway 82 for falling from the member 80.

The time sequence of the withdrawal of the blades 94 from cherries 1 before pawl 108 clears tooth 93 and allows plates 85 to return to the full line position of FIG. 10 is most important, and it is in this regard that flange 96 of sleeve 95 serves its primary function.

In order to avoid damage to the fruit and possible damage to the mechanism, it is very important that blades 94 be completely withdrawn from the cherry being pitted before plates 85 and the structure carried thereby start their counterclockwise return motion. Thus at approximately the time plates 85 reach the dot-dash position 117, projection 104 on guide 89 will cam against pawl 106 and force it to disconnect from projection 103 on rod 87 allowing said rod to quickly return to its withdrawn position under the urgency of spring 98. As blades 94 withdraw from the cherry with rod 87, sleeve 95 is urged in the opposite direction under the urgency of spring 86. Flange 96, resting against the blossom end of the cherry, serves to hold said cherry in place and strip it from blades 94.

Shortly thereafter cam 112 forces pawl 108 to clear tooth 93 and plates 85 are allowed to return to the full line position of FIG. 10 under the urgency of spring 90 without possibility of damage to either fruit or mechanism.

As seen in FIG. 1, a rotary brush 118 disposed adjacent to the sprocket wheels 38 will sweep the cherry receiving sides of the pit passing members 80 and one or more water jets 116 directed against said members 80 will clean them at a point or points ahead of the brush 118. The latter is on a shaft supported at its ends in bearings on frame 9 and a pulley on said shaft may connect with a pulley on shaft 37 or 39, whichever is most suitable, for rotating the brush 118.

Also a rotary brush 115 may be positioned adjacent to the inner side of conveyor 11 for cleaning the members 15 as they pass brush 115 and this brush may be rotatably supported on frame 9 and connected by a belt with shaft 41 for rotation of the brush.

In some instances it may be desirable to orient the stems of the cherries at the orienting station B more rapidly than where the brush 70 is stationary, and in this instance an endless brush 119 (FIG. 13) may be positioned below the conveyor 14 at the orienting station B for movement of the upper run of the belt in a direction opposite to the direction of movement of the conveyor 14. Shafts 120 rotatably supported at their ends on frame 9, may support the pulleys 121 over which the brush 119 extends and any suitable source of power 122 may be connected with one of shafts 120 for driving the brush 119.

When side pitting is desired, as illustrated in FIG. 16, it is merely necessary to shift the pitting assembly counterclockwise from the position shown in FIG. 10 until the axis of the pitting knives 94 are at an angle to the stem-blossom axis of the cherry 1, and to substitute pit passing members 125 of FIGS. 16, 17 for the members 80.

Each of the pit passing members 125 is formed with a concave recess 126. As each cherry holding member meets the pit passing member 125 at sprocket 88, the generally forwardly and downwardly facing side of each cherry will rest against the concave surface of the recess 126. A passageway 127 having a restricted diameter end opening into the recess 126 is in substantially axial alignment with the axis of the blades 94.

The pin 105 that carries pawl 106 and the cam 112 of FIG. 10 will, of course, be positioned relative to the shifted pitting assembly on plates 85 to have the same relation to the assembly as in FIG. 1.

With the above arrangement, as the cherries are carried around the sprockets 38 the pitting blades will enter one of the lateral sides of each cherry and eject the pit out of the opposite side through passageway 127. In so doing, the pit will be separated from the stem, but the stem will remain connected to the cherry.

Heretofore the machine has been described with reference to a single endless row of holders 15. Obviously each holder may have a plurality of V-shaped forwardly opening recesses, as seen in FIG. 14. Thus two or more cherries may be carried, and the other elements and members are duplicated to correspond to the number of cherries adapted to be carried.

In operation, the cherries 1 are bulk fed to the hopper over the lower run 2 of belt 3 at the feed station A, and here a single cherry is deposited between the sides 18 of each holder. At this station the stems may project in any direction.

As soon as the cherries reach the orienting station B, they pass onto the free ends of the bristles of brush 70 and will roll on said brush until the stem of each cherry engages the brush, after which the stem is quickly moved between the holder and brush to a trailing position, extending straight behind each cherry, and the slight drag on the stem will hold the stem end of the cherry against the leading projection 21 of each holder 15 with the blossom-stem axis extending uniformly angularly upwardly relative to the path of travel of each cherry.

From this orienting station B, the cherries pass the separating station where the stemless cherries will be separated from the holders 15 and will be ejected from the path of travel of the unstemmed cherries, after which the unstemmed cherries will go to the pitting station where the pits and stems will be removed from the cherries along the line of the blossom stem axis of each cherry and out of the stem end.

Or, as described for FIG. 16, the pit may be ejected through a lateral side of each cherry leaving the stem on the cherry.

It is to be understood that one of the main features of the invention is the orienting of the cherries by their stems for the pitting or other operation and holding the stems oriented during such other operation.

While the use of a brush having yieldable fiber or plastic bristles is preferable, it is to be understood that projections of rubber or belting may be used. The stems will straighten out as drawn between such projections and will be frictionally held after they have straightened out, but are readily slidable between the projections. The projections should be sufficiently yieldable to not injure the cherries. The free ends of bristles or projections provide a friction surface, which is adequate for engagement with the stems and over which the cherries are drawn.

This friction surface should extend outwardly of the lateral sides of each holder 15.

In FIGS. 10, 12 and 16 a base plate 13 is shown vulcanized or otherwise secured to the rubber or rubber-like body of the member 15. This plate is spaced from the juncture between the sides 18 of the holder so as not to present a hard edge to the stem where the latter is drawn against the projection 21. The purpose of the plate is to provide a wear surface for contacting the brush 70.

One of various modifications is illustrated in FIG. 15 in which a cherry holding member 129 has a wedge-shaped bottom which corresponds to a wide V-shaped top on brushes 70. This will tend to center a cherry more readily between the sides of member 129.

As illustrated in FIGS. 16 and 18 the major portions of the holding member 15 and pit passing member 80 may be of a solid and wear resistant material such as metal. However it is important to have a relatively soft and elastic material around the pit passing opening in order to aid in the pit ejecting process and in order to protect the sharp points of blades 94. Therefore it is practical to provide rubber inserts 130 which will snap into place in the pit passing member and cherry holding member and form the pit passing opening. Said inserts are easily and economically replaced when the old parts become worn and yet the major portion of each member will last indefinitely. This eliminates the costly and time consuming job of disassembling and replacing said members in their entirety.

It is to be understood that the claims appended hereto are intended to cover all changes and modifications of the forms of the invention herein disclosed which do not constitute departures from the spirit and scope of the invention.

I claim:

1. The method of orienting fruit bodies, such as whole cherries and the like, having stems thereon projecting randomly upwardly, downwardly and laterally therefrom, that comprises the steps of:
    (a) supporting each fruit body on a friction surface for rolling thereon and relative thereto in one direction in a path of travel with its stem projecting in any of said random directions relative to said one direction, and with the area ahead of said body free from obstruction to free movement of said stem about the axis of said body during said rolling of the latter;
    (b) rolling said body on said surface in said one direction until said stem engages said surface; then
    (c) continuing movement of said body on said surface and at the same time moving said stem under the influence of its engagement with said surface and while in said engagement, to a trailing, oriented position relative to the direction of movement of the latter.

2. The method as defined in claim 1 that includes the steps of:
    (d) continuing movement of said body in said path and at the same time frictionally holding said stem in said oriented trailing position, whereby said body will be held against rotation during said last mentioned movement of said body.

3. In the method as defined in claim 1:
    (d) said rolling of said body being caused by pushing said body in said one direction against its trailing surface.

4. The method of orienting and pitting fruit bodies, such as whole cherries and the like, having stems thereon projecting therefrom that comprises the steps of:
    (a) supporting each fruit body on a friction surface for rolling thereon and relative thereto in one direction in a path of travel with its stem projecting randomly upwardly, laterally or downwardly relative to said one direction;
    (b) rolling said body on said surface in said one direction by pushing said body in said one direction against its trailing surface until its stem engages said friction surface; then
    (c) continuing movement of said body in said path and in said one direction and at the same time moving said stem under the influence of its frictional engagement with said frictional surface and during said engagement, to a trailing position relative to the direction of movement of said body with the stem end of said body facing downwardly generally toward said frictional surface; then
    (d) continuing movement of said body with the stem attached thereto in said trailing position in engagement with said friction surface whereby said body will be held against rolling in said one direction; and
    (e) thereafter and while said body is moving in said one direction with said stem in said trailing position supporting said body and stem out of engagement with said friction surface with the stem end of said body facing generally downwardly and then ejecting the pit within said body generally downwardly out of said body, and thereafter ejecting said body from said path.

5. In the method as defined in claim 4:
    (f) said step of ejecting said pit from said body being effected by engaging the end of said pit adjacent to the blossom end of said body and moving said pit out of the stem end substantially along the blossom stem axis of the body, whereby said stem will be separated from said body upon ejection of said pit from said stem end of said body.

References Cited by the Examiner

UNITED STATES PATENTS

| | | | |
|---|---|---|---|
| 2,243,530 | 5/41 | Kok | 146—19 |
| 2,361,834 | 10/44 | Frova | 146—19 |
| 2,407,126 | 9/46 | Ashlock | 146—238 |
| 2,415,418 | 2/47 | Coons | 146—19 |
| 2,558,205 | 6/51 | Ashlock | 146—19 |
| 2,714,411 | 8/55 | Aguilar | 146—238 |
| 2,924,259 | 2/60 | Magnuson | 146—238 |

J. SPENCER OVERHOLSER, *Primary Examiner.*